(12) United States Patent  
Yu et al.

(10) Patent No.: US 11,328,529 B2  
(45) Date of Patent: May 10, 2022

(54) FINGERPRINT DETECTION DEVICE AND METHOD THEREOF

(71) Applicants: SAMSUNG ELECTRONICS CO., LTD., Suwon-si (KR); ZINITIX CO., LTD., Yongin-si (KR)

(72) Inventors: Minchul Yu, Suwon-si (KR); Byeongcheol So, Yongin-si (KR); Hieminn Kang, Seongnam-si (KR); Taihyun Yoon, Suwon-si (KR)

(73) Assignees: SAMSUNG ELECTRONICS CO., LTD., Suwon-si (KR); ZINITIX CO., LTD., Yongin-si (KR)

( * ) Notice: Subject to any disclaimer, the term of this patent is extended or adjusted under 35 U.S.C. 154(b) by 0 days.

(21) Appl. No.: 17/009,384

(22) Filed: Sep. 1, 2020

(65) Prior Publication Data  
US 2021/0248340 A1  Aug. 12, 2021

(30) Foreign Application Priority Data  
Feb. 11, 2020  (KR) .................. 10-2020-0016626

(51) Int. Cl.  
*G06V 40/13* (2022.01)  
*G06F 3/044* (2006.01)

(52) U.S. Cl.  
CPC ........ *G06V 40/1306* (2022.01); *G06F 3/0446* (2019.05)

(58) Field of Classification Search  
None  
See application file for complete search history.

(56) References Cited

U.S. PATENT DOCUMENTS

| 9,891,744 | B2 | 2/2018 | Noto |
| 10,572,058 | B2 | 2/2020 | Kim et al. |
| 2011/0273400 | A1 | 11/2011 | Kwon et al. |
| 2012/0256869 | A1 | 10/2012 | Walsh et al. |
| 2014/0035653 | A1 | 2/2014 | Jeong et al. |
| 2016/0188116 | A1* | 6/2016 | Kim ............... G06F 3/04184 345/174 |
| 2018/0121700 | A1* | 5/2018 | Zhang ............. G06K 9/0002 |

FOREIGN PATENT DOCUMENTS

| EP | 3 416 030 A1 | 12/2018 |
| JP | 2015-225381 A | 12/2015 |
| KR | 10-2016-0006982 A | 1/2016 |
| KR | 10-2017-0116756 A | 10/2017 |
| KR | 10-2018-0024500 A | 3/2018 |

OTHER PUBLICATIONS

Communication dated Jun. 28, 2021, from the European Patent Office in European Application No. 21156221.0.

* cited by examiner

*Primary Examiner* — Nicholas J Lee  
(74) *Attorney, Agent, or Firm* — Sughrue Mion, PLLC

(57) ABSTRACT

Disclosed are a fingerprint detection device and a method therefor. A fingerprint detection device includes: a touch panel; at least one amplifier including a first integrator amplifying an electrical signal received from the touch panel to a signal of a first polarity and a second integrator amplifying the electrical signal to a signal of a second polarity; and a processor configured to control the amplifier to perform a first integration process and a second integration process with respect to a plurality of electrical signals received from a plurality of nodes of the touch panel.

29 Claims, 10 Drawing Sheets

FINGERPRINT DETECTION DEVICE AND METHOD THEREOF

CROSS-REFERENCE TO RELATED APPLICATION

This application is based on and claims priority from Korean Patent Application No. 10-2020-0016626, filed on Feb. 11, 2020, in the Korean Intellectual Property Office, the disclosure of which is incorporated herein in its entirety by reference.

BACKGROUND

1. Field

The disclosure relates relate to a fingerprint detection device and a method thereof, and more particularly, to a fingerprint detection device including a multiple integrator and a method thereof.

2. Description of the Related Art

Fingerprint sensors are mainly classified. according to a type of the sensor, into optical fingerprint sensors, semiconductor capacitive sensors, semiconductor temperature sensors, semiconductor pressure sensors, ultrasonic sensors, and radio frequency (RF) sensors.

While using the semiconductor capacitive sensor, a finger of a user touches the "panel" on which tens of thousands of semiconductor electronic devices are integrated and capacitance is formed at the other side. Since the surface of the fingerprint is not flat, convex portions correspond to ridges, and the concave portions correspond to valleys, the actual distances at which the convex and concave portions contact the panel are different, the values of the formed capacitances are also different, and the collected values of different capacitances are combined to complete the collection of fingerprints.

Moreover, in the semiconductor capacitive fingerprint sensor, usually one integrator is included, and in the integrator, the base capacitance of a fingerprint capacitance and the capacitance from the metal layer closest to the fingerprint to the ground, that is, the parasitic capacitance, are formed as one large base signal which is then output, and the magnitude of the base signal is much larger than that of the valid signal corresponding to the fingerprint capacitance. The above-described base signal has a problem of easily saturating the integrator to reduce the dynamic range for the output of the fingerprint sensor.

SUMMARY

One or more embodiment of the disclosure provide a fingerprint detection device capable of increasing the output dynamic range using a multiple integrator and a method thereof.

One or more embodiment of the disclosure provide a fingerprint detection device for reducing parasitic capacitance and offset voltage errors by changing the integration order of multiple integrators and a method thereof.

One or more embodiment of the disclosure provide a fingerprint detection device for reducing the processing load of the amplifier by changing the integration process in units of the driving cycle of the touch panel and a method thereof.

One or more embodiment of the disclosure provide a fingerprint detection device for increasing the number of integrations by adjusting the compensation value according to the integration process and a method thereof.

Additional aspects will be set forth in part in the description which follows and, in part, will be apparent from the description, or may be learned by practice of the presented embodiments of the disclosure.

According to an aspect of the disclosure, there is provided a fingerprint detection device comprising a touch panel including an array of nodes; an amplifier comprising a first integrator configured to amplify an electrical signal received from the touch panel to a first signal of a first polarity and a second integrator configured to amplify the electrical signal to a second signal of a second polarity, wherein the electrical signal changes according to a touch of a user on the touch panel; and a processor configured to control the amplifier to perform a first integration process and a second integration process with respect to a plurality of electrical signals received from a plurality of nodes of the touch panel, wherein, in the first integration process, the first integrator and the second integrator operate repeatedly a plurality of times in a first sequence starting with the first integrator, during a first time period, and in the second integration process, the second integrator and the first integrator operate repeatedly a plurality of times in a second sequence starting with the second integrator during a second time period.

The processor may be further configured to control the amplifier for the second integration process to be performed after the first integration process is performed on all of the plurality of electrical signals.

The second time period may not overlap the first time period.

The second time period may succeed the first time period.

A size of the first time period and a size of the second time period may be same.

At least one of the first time period and the second time period may be same as a one-time driving period of the touch panel.

The touch panel may comprise: a plurality of first electrode lines arranged in a first direction; and a plurality of second electrode lines arranged in a second direction intersecting the first direction, wherein the plurality of nodes are an area where one of the second electrode lines intersects the first electrode lines.

The amplifier may further comprise a compensator configured to adjust an output value of at least one of the first and second integrators.

The compensator may be further configured to adjust an absolute value of the output value to be minimum.

The compensator may comprise: a charging current source configured to charge one of the first and second integrators with electric charge; and a discharging current source configured to discharge electric charge from the other of the first and second integrators.

The processor may be further configured to control the compensator to reduce a difference between the output value of the first integration process and the output value of the second integration process is minimum.

The processor may be further configured to control the compensator to adjust the output value by first adjustment degree during the first integration process and adjust the output value by a second adjustment degree during the second integration process, the second adjustment degree being different from the first adjustment degree.

The processor may be further configured to determine that the first adjustment degree is greater than the second adjustment degree based on the output value of the first integration process being greater than the output value of the second integration process.

Each of the first and second integrators may comprise an operational amplifier and a capacitor connected in parallel with the operational amplifier.

A common voltage may be applied to an inverting terminal of the operational amplifier included in the first integrator and a non-inverting terminal of the operational amplifier included in the second integrator.

The processor may be further configured to recognize a fingerprint of a user using output values of the first and second integration processes.

According to another aspect of the disclosure, there is provided a fingerprint detection method comprising: performing a first integration process in which a first integrator and a second integrator sequentially and repeatedly operate a plurality of times starting with the first integrator, wherein the first integrator amplifies each of a plurality of electrical signals received from a plurality of nodes of a touch panel to a first signal of a first polarity during a first time period and the second integrator amplifies each of the plurality of electrical signals to a second signal of a second polarity; performing a second integration process in which the second integrator and the first integrator operate sequentially and repeatedly a plurality of times starting with the second integrator for each of a plurality of electrical signals during a second time period; and detecting a fingerprint of a user that touches the touch panel based on a result of the first integration process and the second integration process.

The performing of the second integration process may be performed after the first integration process is performed on all of the plurality of electrical signals.

The second time period may not overlap the first time period.

The second time period may succeed the first time period.

A size of the first time period and a size of the second time period may be same.

At least one of the first time period and the second time period may be same as a one-time driving period of the touch panel.

At least one of the performing of the first integration process and the performing of the second integration process may further comprise adjusting an output value of at least one of the first and second integrators.

The adjusting of the output value may comprise adjusting an absolute value of the output value to be minimum.

The adjusting of the output value may comprise at least one of: charging any one of the first and second integrators with electric charge; and discharging electric charge from the other of the first and second integrators.

A first adjustment degree of the output value while performing the first integration process may be different from a second adjustment degree of the output value while performing the second integration process.

The adjusting of the output value may comprise adjusting the output value by a first adjustment degree during the first integration process and adjusting the output value by a second adjustment degree during the second integration process, the second adjustment degree being different from the first adjustment degree.

The adjusting of the output value may comprise, based on the output value of the first integration process being greater than the output value of the second integration process, adjusting the first adjustment degree to be greater than the second adjustment degree.

According to another aspect of the disclosure, there is provided a fingerprint detection device comprising: an amplifier comprising a first integrator configured to amplify an electrical signal received from a touch panel to a first signal of a first polarity and a second integrator configured to amplify the electrical signal to a second signal of a second polarity, wherein the electrical signal changes according to a touch of a user on the touch panel; and a processor configured to control the amplifier to perform a first integration process and a second integration process with respect to a plurality of electrical signals received from a plurality of nodes of the touch panel; and a compensator configured to adjust an output value of at least one of the first and second integrators.

According to another aspect of the disclosure, there is provided a fingerprint detection device comprising: a memory storing one or more instructions; and a processor configured to execute the one or more instructions to: perform a first integration process by controlling a first integrator and a second integrator to sequentially and repeatedly operate a plurality of times starting with the first integrator, wherein the first integrator amplifies each of a plurality of electrical signals received from a plurality of nodes of a touch panel to a first signal of a first polarity during a first time period and the second integrator amplifies each of the plurality of electrical signals to a second signal of a second polarity; perform a second integration process by controlling the second integrator and the first integrator operate sequentially and repeatedly a plurality of times starting with the second integrator for each of a plurality of electrical signals during a second time period; and detect a fingerprint of a user that touches the touch panel based on a result of the first integration process and the second integration process.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
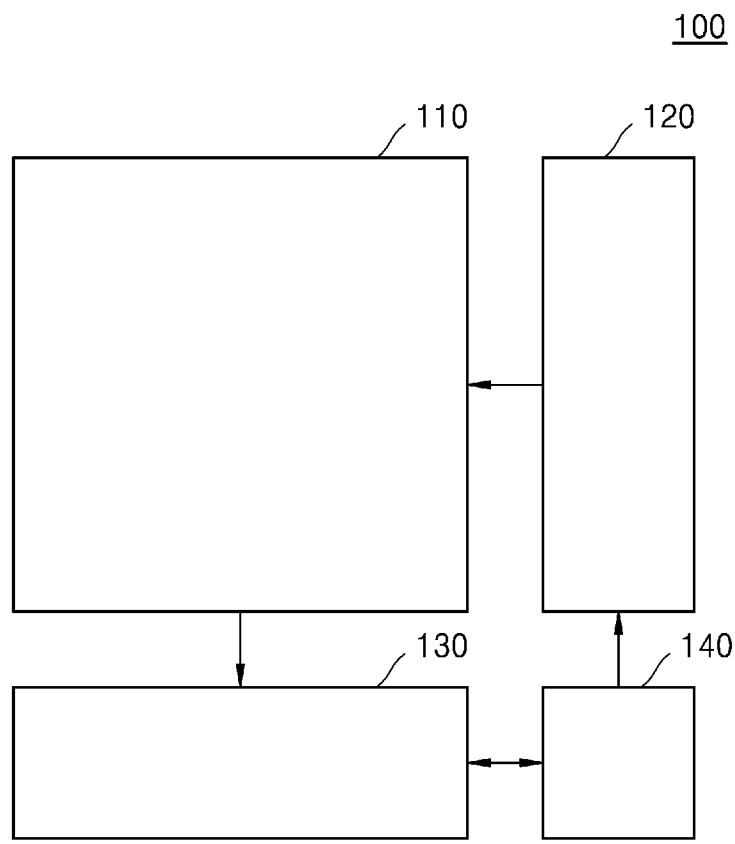
FIG. 1 is a view showing a fingerprint detection device according to an example embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, exemplary embodiments will be described in detail with reference to the accompanying drawings. It should be understood that the following examples are only intended to embody technical content and are not intended to restrict or limit the scope of rights. What may be easily inferred by experts from the detailed description and examples in the relevant technical field is interpreted as belonging to the scope of rights.

As used herein, terms such as 'comprises' or 'includes' should not be construed as including all of the various elements or steps described in the specification, and it should be understood that some of the components or steps may not be included, or may further include additional components or steps. The terms "part", "module", and the like, which are described in the specification, mean a unit for processing at least one function or operation, and may be implemented in hardware or software, or in a combination of hardware and software.

Furthermore, terms including ordinals, such as "first", "second", etc., used herein may be used to describe various elements, but the elements should not be limited by those terms. The terms are used only for the purpose of distinguishing one component from other components.

FIG. 1 is a block diagram showing a fingerprint detection device 100 according to an example embodiment. Referring to FIG. 1, the fingerprint detection device 100 includes a touch panel 110, a transmission circuit 120, a reception circuit 130, and a processor 140. Although only the relevant components are shown in the fingerprint detection device 100 of FIG. 1, it will be understood by those skilled in the art that other general-purpose components may be further included. For example, the touch sensing device 100 may be a capacitive sensing device.

Figure 2:
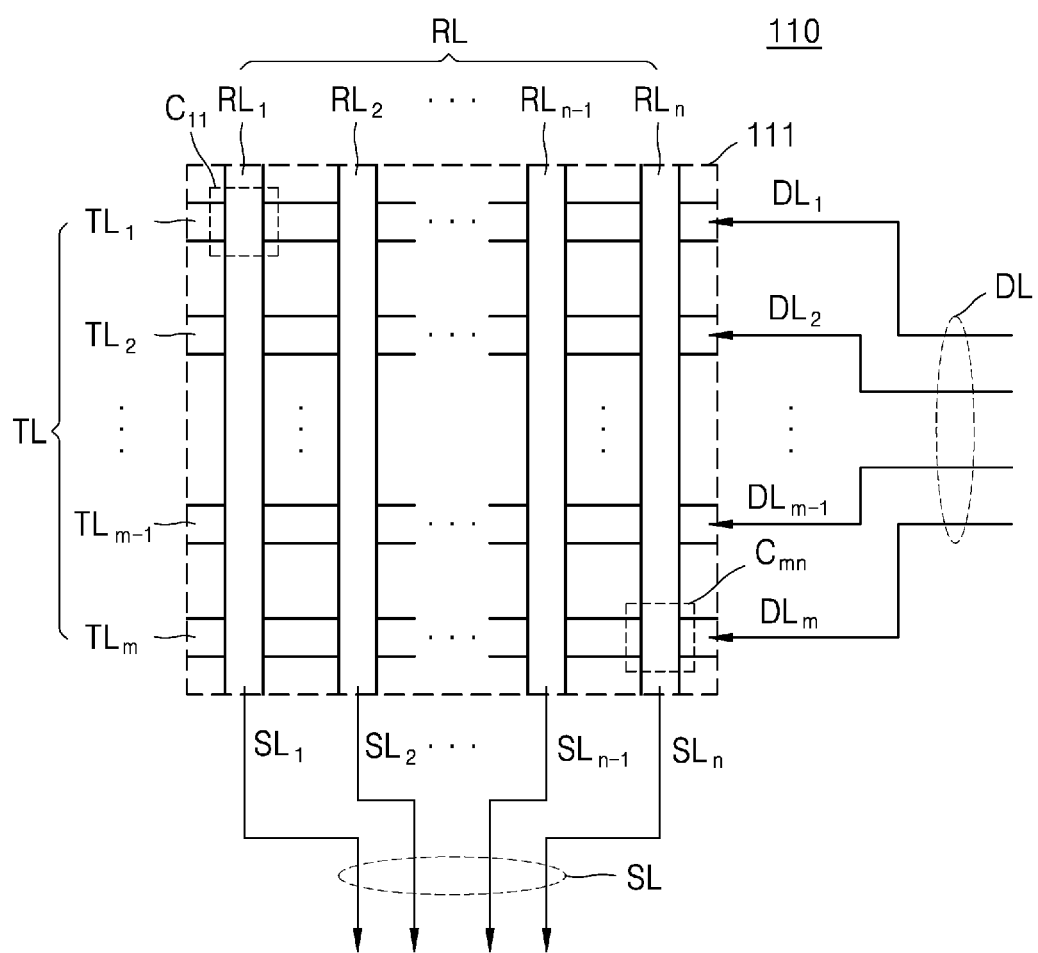
FIG. 2 shows a touch panel according to an example embodiment of the disclosure.

FIG. 2 shows the touch panel 110 according to an example embodiment. Referring to FIGS. 1 and 2, the touch panel 110 includes first electrode lines TL and second electrode lines RL arranged in a touch area 111.

The first electrode lines TL (i.e., $TL_1$, $TL_2$, $TL_{m-1}$ and $TL_m$) may be provided in the touch area 111 to extend in the direction of the horizontal axis. The second electrode lines RL (i.e., $RL_1$, $RL_2$, $RL_{n-1}$ and $RL_n$) may be arranged to extend in the direction of the vertical axis in the touch area 111. The second electrode lines RL may overlap the first electrode lines TL. The first electrode lines TL and the second electrode lines RL may be electrically insulated.

The first electrode lines TL and the second electrode lines RL are shown as lines. However, the disclosure is not limited thereto. For instance each of the second electrode lines RL may further include predetermined patterns provided between nodes where the first electrode lines TL and the second electrode lines RL intersect. The above-described pattern may have various shapes such as polygons and circles. Similarly, each of the first electrode lines TL may further include predetermined patterns provided between the above-mentioned nodes. The area where the first electrode lines and the second electrode lines intersect may be a node.

When a finger of a user approaches the touch panel 110, mutual capacitance between each of the first electrode lines TL and the second electrode lines RL of the touch panel 110 may vary. For example, according to the characteristics of the fingerprint pattern of the user finger, the mutual capacitance of each of the areas (i.e., nodes) where the first electrode lines TL and the second electrode lines RL intersect in the touch panel 110 may vary.

The first electrode lines TL are respectively connected to the driving lines DL (i.e., $DL_1$, $DL_2$, $DL_{m-1}$ and $DL_m$). The second electrode lines RL are respectively connected to the sensing lines SL (i.e., $SL_1$, $SL_2$, $SL_{n-1}$ and $SL_n$). The driving lines DL and the sensing lines SL may be connected to the reception circuit 130.

The transmission circuit 120 is connected to the driving lines DL. The transmission circuit 120 is configured to apply voltage to the driving lines DL under the control of the processor 140. For example, the transmission circuit 120 may sequentially supply a pulse signal including a sequential series of pulses to the driving lines DL.

The reception circuit 130 is connected to the sensing lines SL. The reception circuit 130 is configured to sense a signal transmitted through the sensing lines SL under the control of the processor 140. The reception circuit 130 may convert the sensed signal into a digital signal and transmit the digital signal to the processor 140.

For example, in order to detect a fingerprint, the transmission circuit 120 may sequentially apply different driving signals to each of the first electrode lines TL. Also, the reception circuit 130 may individually receive an electrical signal through each of the second electrode lines SL. For example, when measuring a mutual capacitance $C_{11}$, a driving signal may be applied only to the first electrode line $TL_1$, and an electrical signal may be measured from the first electrode line $RL_1$. Similarly, when measuring a mutual capacitance $C_{mn}$, the driving signal is applied only to the m-th first electrode line $TL_m$, and the electrical signal may be measured from the n-th second electrode line $RL_n$.

The processor 140 may control overall operations of the transmission circuit 120 and the reception circuit 130. For example, the processor 140 may control a magnitude, an application time, and the like of a voltage pulse applied to each of the first electrode lines TL by the transmission circuit 120. Also, the processor 140 may control the transmission circuit 120 such that a voltage pulse is applied to some of the first electrode lines TL.

The processor 140 may generate and process image data related to a user fingerprint using the current or potential received by the reception circuit 130. For example, the processor 140 may generate and process fingerprint image data corresponding to the fingerprint area using the current or potential received by the reception circuit 130, and may generate and process feature point data by analyzing pixel values included in the image data.

Figure 3:
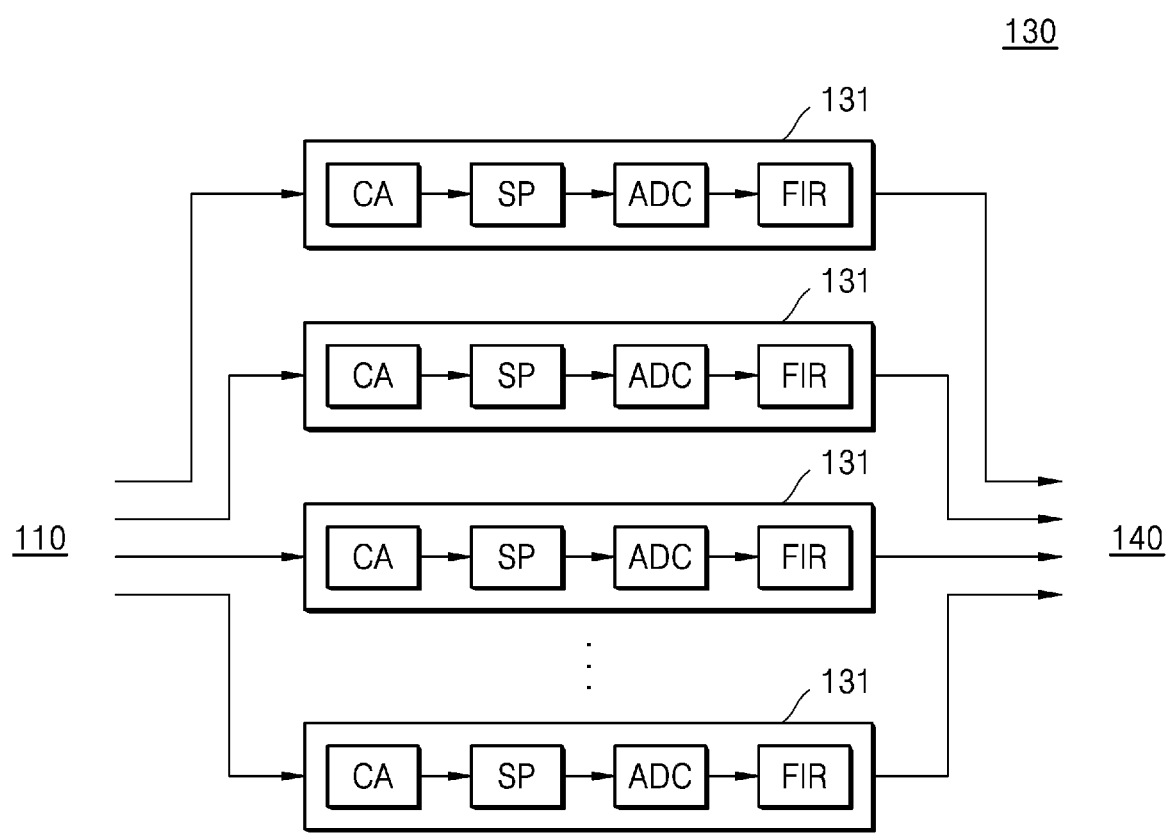
FIG. 3 is a block diagram showing an example of a reception circuit according to an example embodiment.

FIG. 3 is a block diagram showing an example of a reception circuit 130 according to an example embodiment. Referring to FIGS. 1 and 3, the reception circuit 130 includes a plurality of detection units 131.

Each of the detection units 131 may include a charge amplifier CA, a signal processor SP, an analog-to-digital converter ADC, and a filter FIR.

The charge amplifier CA may convert a signal (e.g., a current signal) received through the sensing lines SL into a voltage signal.

The signal processor SP may process the output signal of the charge amplifier CA. For example, the signal processor SP may demodulate the output signal of the charge amplifier CA and perform filtering. The signal processor SP may convert the output signal of the charge amplifier CA into a direct current (DC) signal.

The analog-to-digital converter ADC may convert the output signal of the signal processor SP into a digital signal. The output signal of the analog-to-digital converter ADC may be filtered in the filter FIR. Also, the filtered digital signal may be transmitted to the processor 140.

For example, the charge amplifier CA and the signal processor SP may process an analog signal, and the filter FIR may process a digital signal.

Moreover, when the fingerprint detection device 100 is driven with a high-resolution sensing resolution, the width of the first electrode lines TL may be very narrow. When the width of the first electrode lines TL becomes narrow, the area of the node that is activated while measuring a mutual capacitance becomes small. When the area of the node to be activated becomes small, the strength of the obtained signal may be small, and the amount of change in the mutual capacitance measured at each of the nodes may be too small. Therefore, it may be difficult to get an accurate measurement. Moreover, when layers (i.e., cover layers) covering the first and second electrode lines TL and SL of the touch panel 110 become thicker, the amount of change in the mutual capacitance of the nodes may be small depending on the touch of the user. In that case, accurate measurement may be difficult. Accordingly, the amplifier CA of the fingerprint detection device 100 according to an embodiment may include a plurality of integrators.

Figure 4:
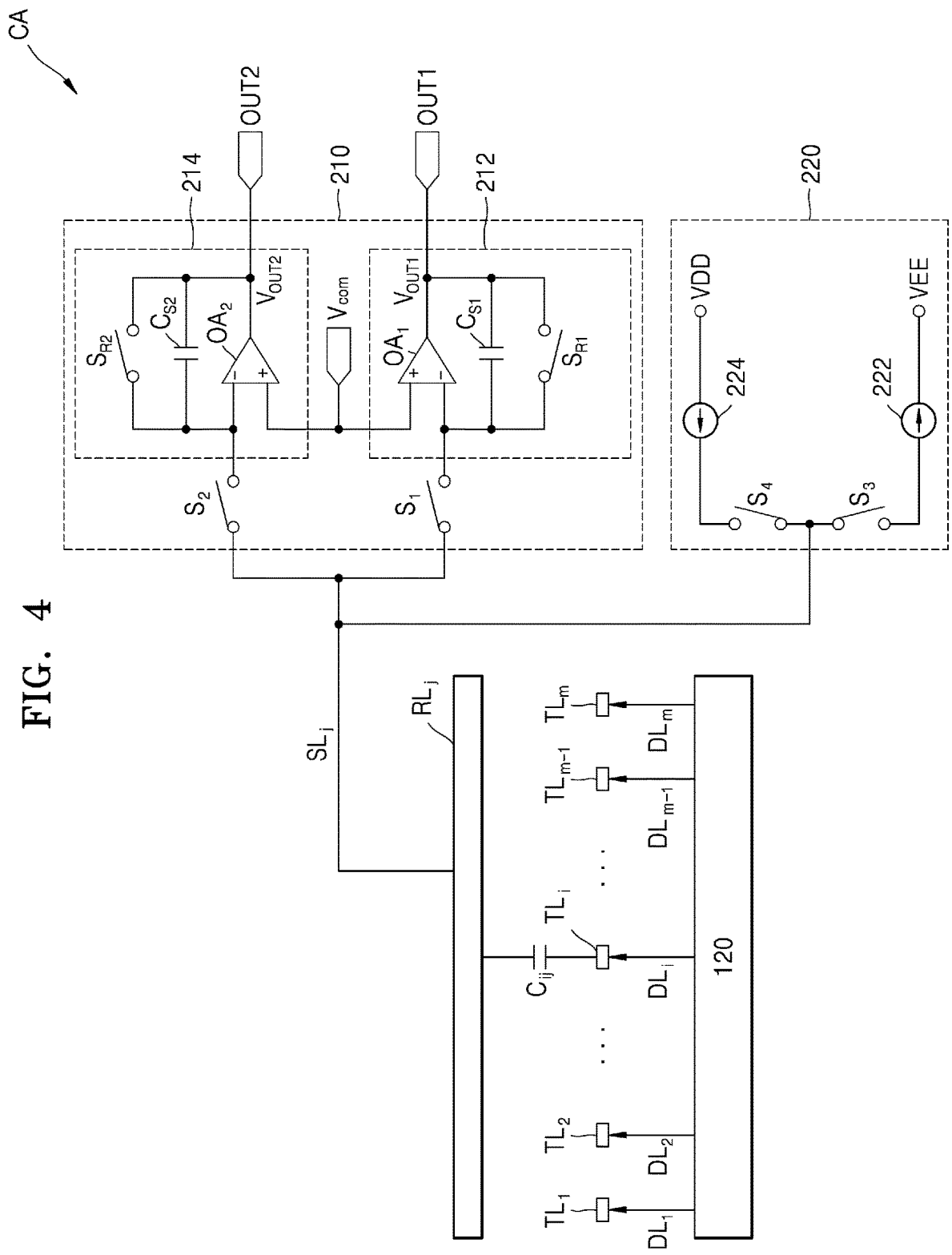
FIG. 4 is a diagram illustrating an amplifier connected to one second electrode line according to an example embodiment.

FIG. 4 is a diagram illustrating an amplifier CA connected to one second electrode line $RL_j$ according to an embodiment. For example, the j-th amplifier CA of the reception circuit 130 may be electrically connected to the second electrode line $RL_j$, and the first electrode lines TL (i.e., $TL_1$, $TL_2$, $TL_{m-1}$ and $TL_m$) may sequentially amplify the mutual capacitance according to the driving signal. For example, the j-th amplifier CA of the reception circuit 130 may be electrically connected to the second electrode line $RL_j$, and the first electrode lines TL (i.e., $TL_1$, $TL_2$, $TL_{m-1}$ and $TL_m$) through a sensing line $SRL_j$, Referring to FIG. 4, the final output signal of the amplifier CA may be defined as a potential difference between the first output terminal OUT1 and the second output terminal OUT2 shown in the drawing.

The amplifier CA may include an integration circuit 210 that amplifies electrical signals received from the touch panel 110 to signals having different polarities. According to an example embodiment, the integration circuit 210 may have a plurality of integrators for amplifying an electrical signal received from the touch panel 110. For example, the integration circuit 210 may include a first integrator 212 for amplifying an electrical signal received from the touch panel 110 into a negative signal and a second integrator 214 for amplifying an electrical signal received from the touch panel 110 to a positive signal. The first integrator 212 may be connected to the first output terminal OUT1, and the second integrator 214 may be connected to the second output terminal OUT2. According to an example embodiment, the plurality of integrators may operate independent for amplifying an electrical signal received from the touch panel 110.

Each of the first integrator 212 and the second integrator 214 may include operational amplifiers $OA_1$ and $OA_2$ and reset switches $S_{R1}$ and $S_{R2}$. According to an example embodiment, the operational amplifiers $OA_1$ and $OA_2$ are connected in parallel. In addition, the amplifier CA may include a first switch $S_1$ connecting the sensing line $SL_j$ and the first integrator 212 and a second switch $S_2$ connecting the sensing line $SL_j$ and the second integrator 214.

Specifically, the inverting input terminal (−) of the first operational amplifier $OA_1$ of the first integrator 212 and the sensing line $SL_j$, may be connected to each other through a first switch $S_1$. According to an example embodiment, the sensing line $SL_j$ is connected to one second electrode line $RL_j$, which is connected to a terminal of a capacitor forming mutual capacitance. Moreover, the inverting input terminal (−) of the first operational amplifier $OA_1$ and the first output terminal OUT1 may be connected to each other through a first capacitor $C_{S1}$. Also, the inverting input terminal (−) of the first operational amplifier $OA_1$ and the first output terminal OUT1 may be connected to each other through the first reset switch $S_{R1}$. A reference voltage $V_{com}$ may be connected to a non-inverting input terminal (+) of the first operational amplifier $OA_1$.

The inverting input terminal (−) of the second operational amplifier $OA_2$ and the sensing line $SL_j$ may be connected to each other through the second switch $S_2$. Moreover, the inverting input terminal (−) of the second operational amplifier $OA_2$ and the second output terminal OUT2 may be connected to each other through the second capacitor $C_{S2}$. Then, the inverting input terminal (−) of the second operational amplifier $OA_2$ and the second output terminal OUT2 may be connected to each other through the second reset switch $S_{R2}$. A reference voltage $V_{com}$ may be connected to the non-inverting input terminal (+) of the second operational amplifier $OA_2$.

In this case, the first capacitor $C_{S1}$ and the second capacitor $C_{S2}$ may function as an integral capacitor that accumulates and stores charge flowing through the sensing line $SL_j$.

The processor 140 may control operating states of the first and second switches $S_1$ and $S_2$ and the first and second reset switches $S_{R1}$ and $S_{R2}$.

Figure 5:
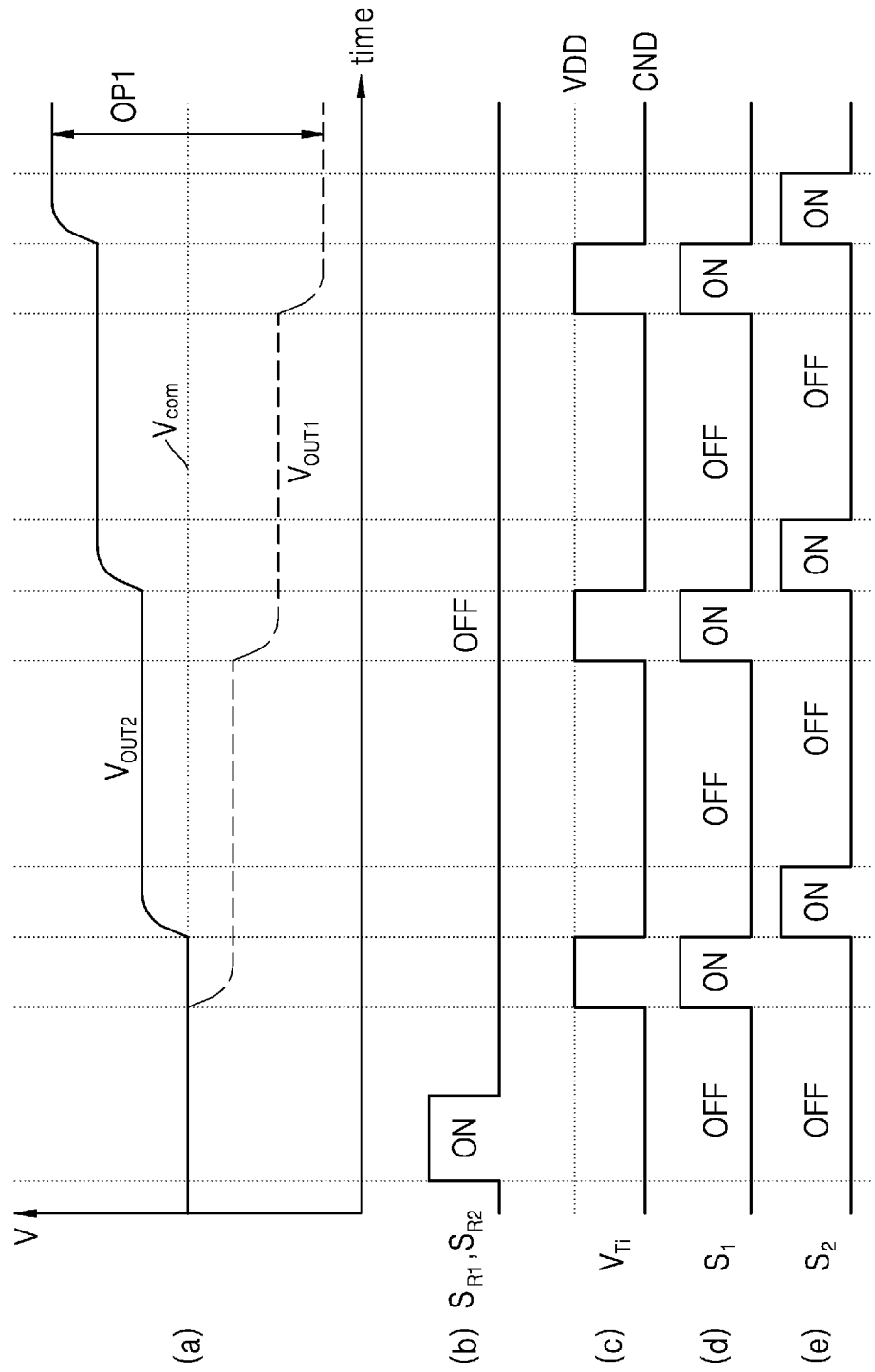
FIG. 5 is a timing diagram showing voltages at each switch and a specific node (e.g., Cij) included in a multiple integrator shown in FIG. 4.

FIG. 5 is a timing diagram showing voltages at each switch and a specific node (e.g., $C_{ij}$) included in the integration circuit 210 shown in FIG. 4. In FIG. 5, the horizontal axis represents a time section.

FIG. 5 shows a graph (a) of a first output voltage $V_{OUT1}$ of an output terminal of a first operational amplifier $OA_1$ according to a time section and a second output voltage $V_{OUT2}$ of an output terminal of a second operational amplifier $OA_2$ according to a time section.

Moreover, FIG. 5 shows a timing graph (b) of reset signals for controlling on/off states of first and second reset switches $S_{R1}$ and $S_{R2}$, a timing graph (c) of a potential VTi of a first electrode line TLi, a timing graph (d) for showing signals for controlling on/off states of a first switch $S_1$ and a timing graph (e) for showing signals for controlling on/off states of a second switch $S_2$.

After the reset signal is applied to the first integrator 212 and the second integrator 214, in a state where an on signal is applied to the first electrode line $TL_j$, when the first switch $S_1$ is turned on and the second switch $S_2$ is turned off, the first operational amplifier $OA_1$ is driven to discharge the charge Q in the first capacitor $C_{S1}$. Due to the discharge of charge, as the corresponding charge decreases at the first output terminal OUT1, an output signal for drawing a dotted waveform is generated in the first output terminal OUT1 as in graph (a) of FIG. 5.

Further, in a state where an on signal is applied to the first electrode line $TL_i$, when the first switch $S_1$ is off and the second switch $S_2$ is on, the second operational amplifier $OA_2$ is driven to charge the second capacitor $C_{S2}$. Due to the charging of electric charges, as the corresponding charge increases at the second output terminal OUT2, an output signal for drawing a solid line waveform is generated in the second output terminal OUT2 as in graph (a) of FIG. 5.

As shown in graphs (a) of FIG. 5, when the first and second switches $S_1$ and $S_2$ are sequentially turned on/off N times (where N is an integer), the charge is repeatedly discharged and charged N times, the size of the output signal is increased. As described above, since a plurality of integrators are driven alternately, the integration effect may be seen as much as the difference OP1 of the output signal between the first output terminal OUT1 and the second output terminal OUT2, so that the output dynamic range may be increased.

Specifically, if two integrators are driven alternately, the output value of the amplifier CA may be different as much as a difference in signals generated due to a difference in depth between the ridges of the fingerprint. Therefore, as the number of integrals increases, the difference in signal between the ridges of the fingerprint may be obtained, so that the inaccuracy caused by the thickness of a thick cover and the width of electrode lines may be alleviated.

In addition, the input electrical signal of the amplifier CA may include capacitance of nodes other than the corresponding node in the touch panel 110 or parasitic capacitance Cp formed in an arbitrary area of metal materials of the fingerprint detection device 100 included in the reception circuit 130 in addition to 'sensing capacitance C' formed between the nodes corresponding to the touch of a subject. If there is no finger of the subject near the second electrode line SL, the value of 'sensing capacitance' may have a value close to zero, but the input signal by the parasitic capacitance Cp may still be applied to the input terminal of the amplifier CA. The parasitic capacitance Cp may cause voltage saturation of the first integrator 212 and the second integrator 214 to limit the number of integrations of the integration circuit 210.

In addition, in processing the components of the amplifier CA, due to process variations, an offset voltage difference $\Delta V$ between the first operational amplifier $OA_1$ and the second operational amplifier $OA_2$ may occur. That is, the amplifier CA may operate as if different potentials are applied to the non-inverting input terminal (+) of the first operational amplifier $OA_1$ and the non-inverting input terminal (+) of the second operational amplifier $OA_2$.

Figure 6:
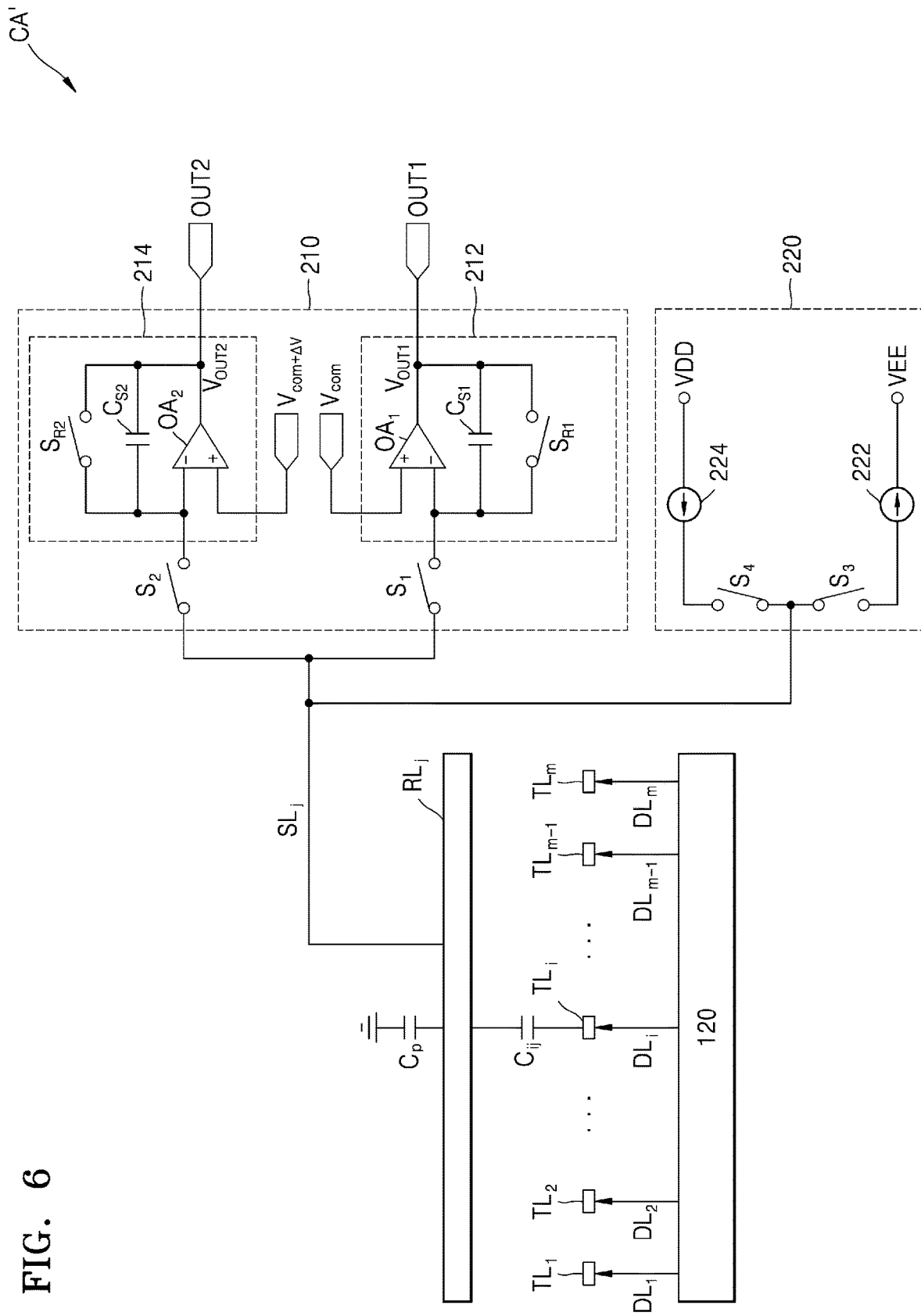
FIG. 6 is a diagram showing an amplifier having a parasitic capacitance and an offset voltage difference.

FIG. 6 is a diagram showing an amplifier CA' having a parasitic capacitance Cp and an offset voltage difference $\Delta V$.

Figure 7:
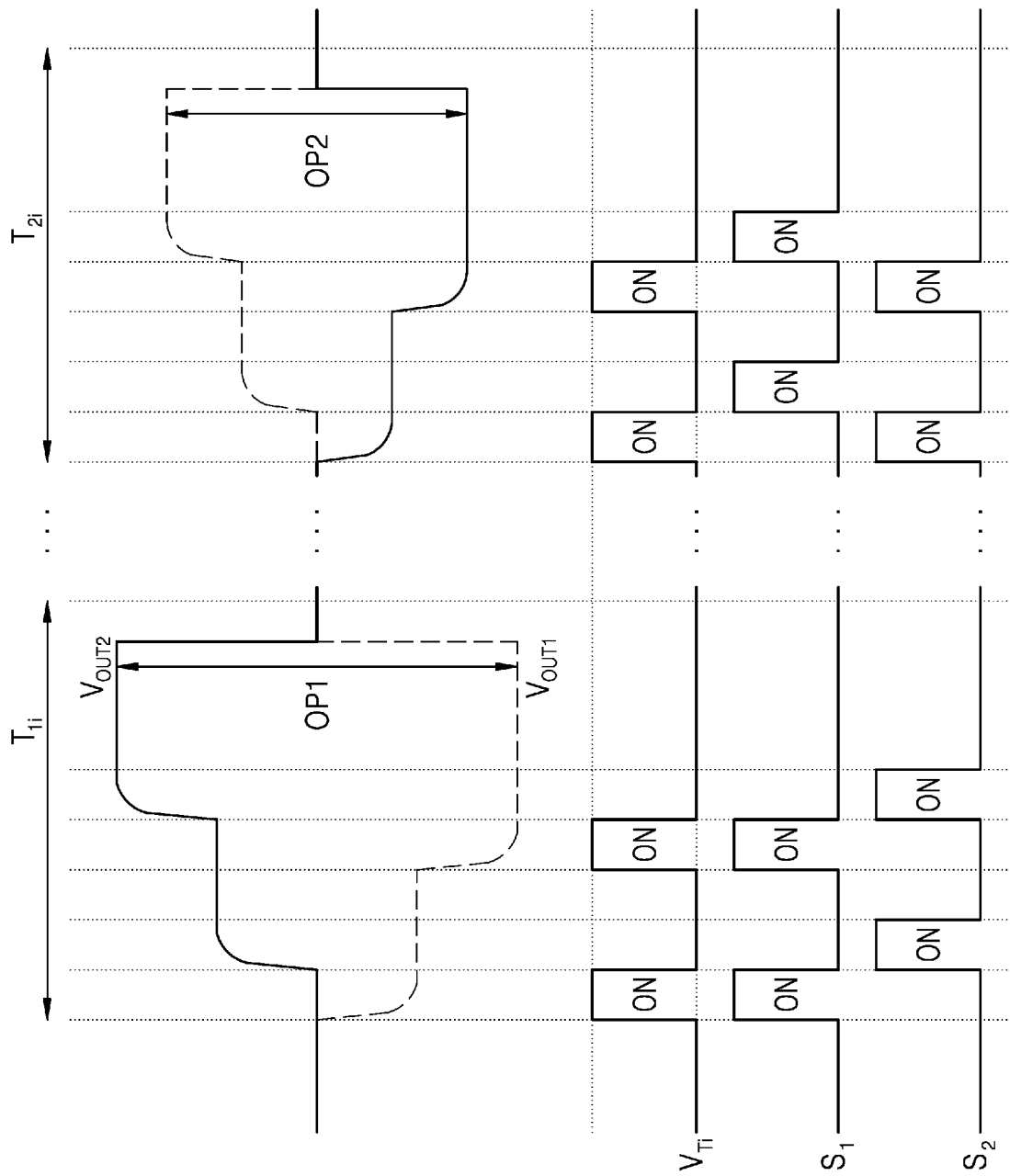
FIG. 7 is a timing diagram illustrating an operation state for each time section of a multiple integrator according to an example embodiment.

During operation of an amplifier CA, even if the same reference voltage Vcom is applied to the non-inverting input terminals (+) of the first and second operational amplifiers $OA_1$ and $OA_2$, because of the deviation between each of the operational amplifiers $OA_1$ and $OA_2$, the non-inverting input terminals (+) of the first and second operational amplifiers $OA_1$ and $OA_2$ may operate as if different potentials Vcom and Vcom+$\Delta V$ are substantially applied. As shown in FIG. 7, the non-inverting input terminal (+) of the first operational amplifier OA1 operates as if Vcom is substantially applied, and the non-inverting input terminal (+) of the second operational amplifier OA2 may operate as if Vcom+$\Delta V$ is substantially applied.

As such, due to the process deviation between the operational amplifiers $OA_1$ and $OA_2$, an error may occur in the output signal of an integrating device. In order to eliminate these errors, the amplifier CA according to an embodiment may perform an integration process of obtaining an output value of the amplifier CA by changing the operation order of the first switch $S_1$ and the second switch $S_2$. By using the values obtained through the two processors 140, one piece of information on the touch input may be obtained.

FIG. 7 is a timing diagram showing an operation state for each time section of a integration circuit 210 according to an embodiment.

In FIG. 7, a first integration process and a second integration process may be performed, respectively, during a first time section T1$i$ and a second time section T2$i$.

The first integration process may be an operation of amplifying the electrical signal received from the touch panel 110 by the first integrator 212 and then amplifying the amplified electrical signal by the second integrator 214. Thus, in the first integration process, if the first switch $S_1$ and the second switch $S_2$ successively undergo a transition of the off state-on state-off state once each, one integral count is completed.

Specifically, immediately after the operational amplifiers $OA_1$ and $OA_2$ are reset in the first time section T1$i$, the on state of the first switch $S_1$ and the second switch $S_2$ may be switched in order of the first switch $S_1$ and the second switch $S_2$ for every integral count of the first integration process. For example, in a state where a signal is applied to the first electrode line TL$i$ in the first time section T1$i$, when the first switch $S_1$ is turned on and the second switch $S_2$ is turned off, the first operational amplifier $OA_1$ is driven to discharge electric charges from the first capacitor $C_{S1}$. Due to the discharge of charge, as the corresponding charge decreases at the first output terminal OUT1, an output signal for drawing a dotted waveform is generated in the first output terminal OUT1 as in FIG. 7.

Then, in a state where an on signal is applied to the first electrode line TL$i$, when the first switch $S_1$ is off and the second switch $S_2$ is on, the second operational amplifier $OA_2$ is driven to charge the second capacitor $C_{S2}$. Due to the charging of electric charges, as the corresponding charge increases at the second output terminal OUT2, an output signal for drawing a solid line waveform is generated in the second output terminal OUT2 as in FIG. 7.

The first integration processor 140 may operate repeatedly in the order from the first integrator 212 to the second integrator 214 multiple times. In FIG. 7, the first integration processor is formed by two integral counts.

The second integration process may mean an operation of amplifying the electrical signal received from the touch panel 110 by the second integrator 214 and then amplifying the amplified electrical signal by the first integrator 212. Thus, in the second integration process, if the second switch $S_2$ and the first switch $S_1$ successively undergo a transition of the off state-on state-off state once each, one integral count is completed. The second integration processor 140 may operate repeatedly in the order from the second integrator 214 to the first integrator 212 multiple times.

Specifically, immediately after the operational amplifiers $OA_1$ and $OA_2$ are reset in the second time section T2$i$, the on state may be switched in order of the second switch $S_2$ and the first switch $S_1$ for every integral count of the second integration process. For example, in a state where a signal is applied to the first electrode line TL$i$ in the second time section T2$i$, when the second switch $S_2$ is turned on and the first switch $S_1$ is turned off, the second operational amplifier $OA_2$ is driven to discharge electric charges from the first capacitor $C_{S1}$. Due to the discharge of charge, as the corresponding charge decreases at the second output terminal OUT2, an output signal for drawing a solid waveform is generated in the second output terminal OUT2 as in FIG. 7.

Then, in a state where an on signal is applied to the first electrode line TLi, when the second switch $S_2$ is off and the first switch $S_1$ is on, the first operational amplifier $OA_1$ is driven to charge the first capacitor $C_{S1}$. Due to the charging of electric charges, as the corresponding charge increases at the first output terminal OUT1, an output signal for drawing a dotted waveform is generated in the first output terminal OUT1 as in FIG. 7.

In the second integration processor 140, the second integrator 214 and the first integrator 212 may be sequentially and repeatedly operated multiple times. In FIG. 7, two times of an integral count form a second integration process.

Both the output value OP1 of the first integration process and the output value OP2 of the second integration process are affected by the parasitic capacitance Cp and the offset voltage difference ΔV. For example, the output value OP1 of the first integration process is increased by the parasitic capacitance Cp and the offset voltage difference ΔV, and the output value OP2 of the first integration process is reduced by the parasitic capacitance Cp and the offset voltage difference ΔV. Thus, parasitic capacitance Cp and offset voltage difference ΔV may be eliminated by using both the output values OP1 and OP2 of the first and second integration processes. For example, the sum or average value of the output values OP1 and OP2 of the first and second integration processes may be determined as the output value of the amplifier CA.

In addition, even if the first and second integration processes are used, each integration process is still affected by the parasitic capacitance Cp and the offset voltage difference ΔV, so there is a limit to increase the integral count. In FIG. 7, the integral count may be limited by the output value of the first integration processor 140.

When performing each of the first integration process and the second integration process, the integral count may be increased by adjusting the output value. The amplifier CA according to an embodiment may further include a compensator 220 that adjusts at least one output value of the first and second integration processes, that is, an output value.

Referring to FIG. 4 again, the amplifier CA may further include a compensator 220 that applies a constant current to the first integrator 212 and the second integrator 214. The compensator 220 may include a discharging current source 222 for discharging electric charges to any one of the first integrator 212 and the second integrator 214, a charging current source 224 for charging the charge to the other of the first integrator 212 and the second integrator 214, a third switch S3 connecting the discharging current source 222 and the integration circuit 210, and a fourth switch S4 connecting the discharging current source 222 and the integration circuit 210.

The processor 140 may control the output values of the integration circuit 210 by charging or discharging charges in the integration circuit 210 by controlling the first and second switches $S_1$ and $S_2$. The processor 140 may control the compensator 220 so that the amount of change in the output value of the integration circuit 210 with respect to the integral count is small. The processor 140 may perform synchronization such that the first and second switches $S_1$ and $S_2$ connected to the integration circuit 210 and the third and fourth switches $S_3$ and $S_4$ connected to the compensator 220 operate in synchronization with each other and the directions (i.e., the signs) of the current inputted to the integration circuit 210 and the current inputted to the compensator 220 become the same each other. Then, the rising width at the rising edge of the output value of the integration circuit 210 may be small, and the falling width at the falling edge may be small.

Figure 8:
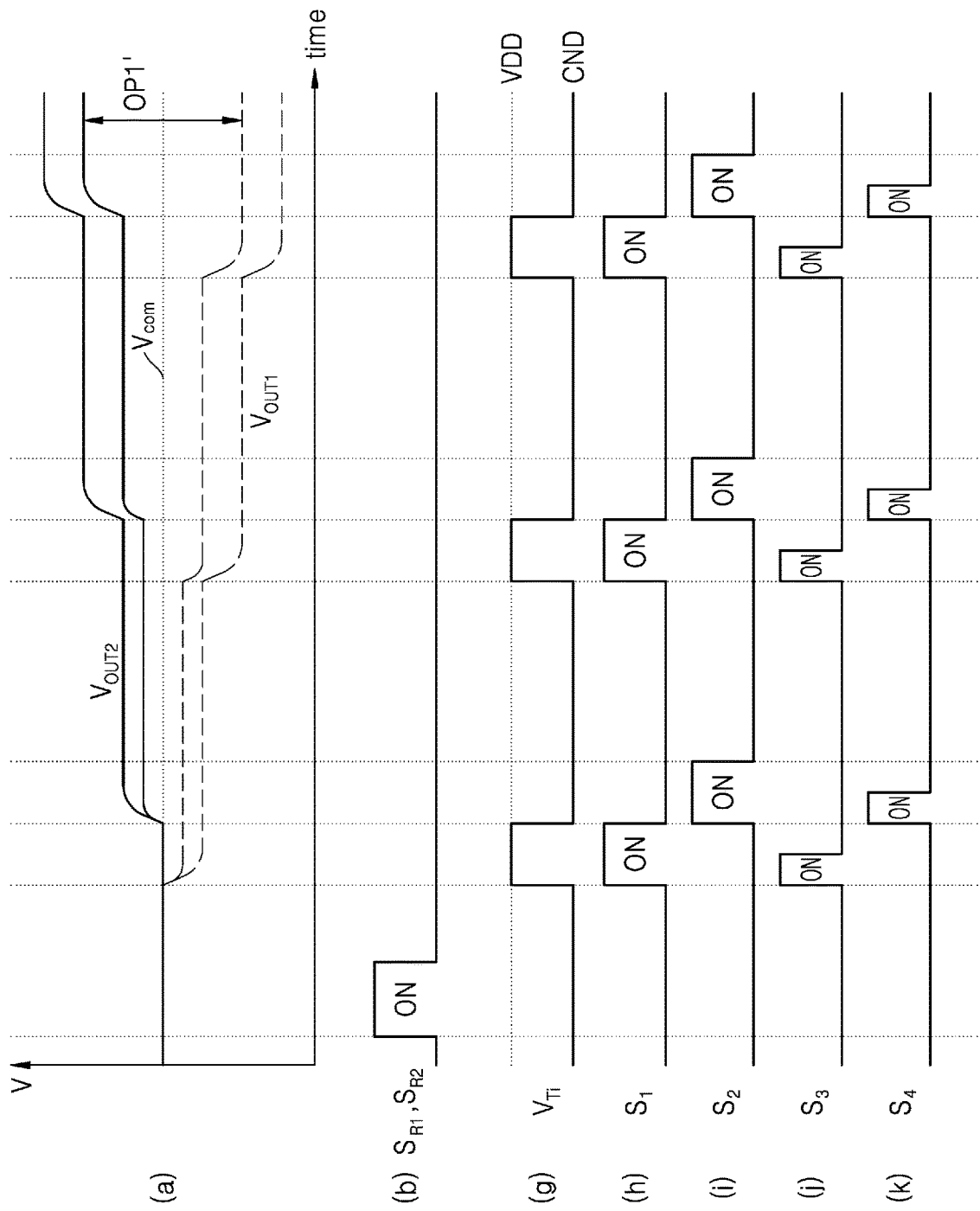
FIG. 8 is a timing diagram illustrating output values of a multiple integrator by a compensator according to an example embodiment.

FIG. 8 is a timing diagram illustrating output values of the integration circuit 210 by the compensator 220 according to an embodiment.

FIG. 8 shows a graph (a) of a first output voltage $V_{OUT1}$ of an output terminal of a first operational amplifier $OA_1$ according to a time section and a second output voltage $V_{OUT2}$ of an output terminal of a second operational amplifier $OA_2$ according to a time section.

FIG. 8 shows a timing graph (b) of signals for controlling on/off states of first and second reset switches $S_{R1}$ and $S_{R2}$, a timing graph (g) of a potential VTi of a first electrode line TLi, a timing graph (h) for showing signals for controlling on/off states of a first switch $S_1$, a timing graph (i) for showing signals for controlling on/off states of a second switch $S_2$, a timing graph (j) for showing signals for controlling on/off states of a first switch $S_3$ and a timing graph (k) for showing signals for controlling on/off states of a second switch $S_4$.

The signal of the third switch $S_3$ may be synchronized with the signal of the first switch $S_1$ and the signal of the fourth switch $S_4$ may be synchronized with the signal of the first switch $S_1$. At this time, the duration time section for the on state of the third switch $S_3$ may be shorter than the duration time section for the on state of the first switch $S_1$, and the duration time section for the on state of the fourth switch $S_4$ may be shorter than the duration time section for the on state of the second switch $S_2$.

After the reset signal is applied to the first integrator 212 and the second integrator 214, in a state where an on signal is applied to the first electrode line TLi, when the first switch $S_1$ and the third switch $S_3$ are turned on and the second switch $S_2$ and the fourth switch $S_4$ are turned off, the current from the sensing line SLj is distributed to the integration circuit 210 and the compensator 220. Thus, even if the first operational amplifier $OA_1$ is driven, the amount of charge discharged from the first capacitor $C_{S1}$ is small, so that the degree of charge reduction in the first output terminal OUT1 is reduced.

Next, in a state where an on signal is applied to the first electrode line TLi, when the first switch $S_1$ and the third switch $S_3$ are turned off and the second switch $S_2$ and the fourth switch $S_4$ are turned on, the current from the sensing line SLj is distributed to the integration circuit 210 and the compensator 220. Thus, even if the second operational amplifier $OA_2$ is driven, the amount of charge charged in the second capacitor $C_{S2}$ is small, so that the degree of charge increase in the second output terminal OUT2 is reduced.

According to an example embodiment, because the output value of the integration circuit 210 may be adjusted by the compensator 220 to be small, the integral count of the integration circuit 210 may be increased. The degree of adjusting the output value of a integration circuit may be called a compensation value. The compensation value may be adjusted by the size of the current of the discharging current source 222 and charging current source 224. For example, as the discharging or charging current of the discharging current source 222 and the charging current source 224 is greater, the compensation value may be large.

The compensator 220 may apply the same compensation value or different compensation values to the first integration process that performs integration in order of the first integrator 212 and the second integrator 214, and the second integration process that performs integration in order of the second integrator 214 and the first integrator 212. For example, if the change in the output value of the first integration process is greater than the change in the output value of the second integration process, the compensation value applied to the first integration process may be greater than the compensation value applied to the second integration process. Then, the integral count may be increased instead of applying the same compensation value.

Meanwhile, in order to apply the compensation values differently, the charging current source 224 of the compensator 220 and the current value of the compensation current source must be adjusted. When the first integration process and the second integration process are continuously performed on one node, the processing load of the reception circuit 130 may be increased. Accordingly, at least one amplifier CA included in the reception circuit 130 according to an embodiment performs a first integration process for a plurality of nodes electrically connected to each amplifier CA, and then performs a second integration process.

Figure 9:
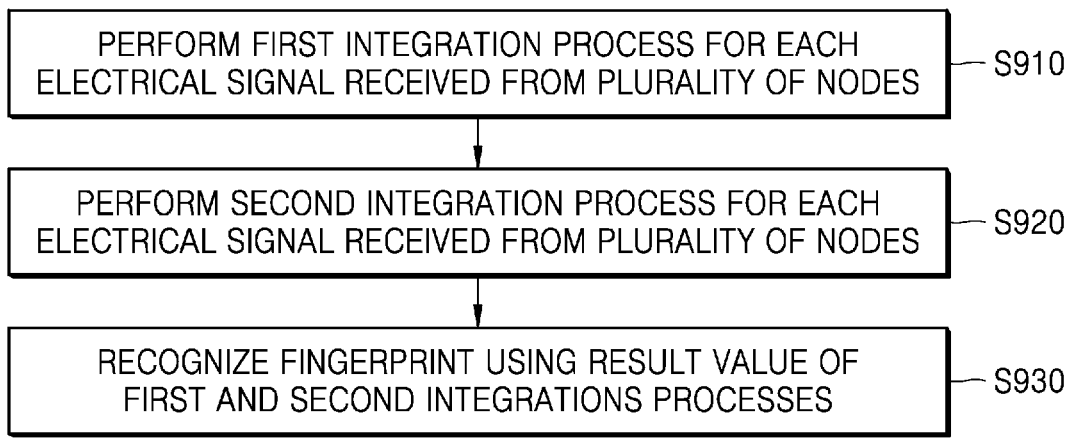
FIG. 9 is a flowchart illustrating an operation method of a fingerprint detection device according to an example embodiment.

FIG. 9 is a flowchart illustrating an operation method of the fingerprint detection device 100 according to an embodiment.

The processor 140 may control the amplifier CA to perform a first integration process for each of the electrical signals received from a plurality of nodes of the touch panel 110 during the first time section (S910). Each of the plurality of amplifiers CA may be electrically connected to a corresponding second electrode line through a corresponding sensing line. Each of the second electrode lines may intersect a plurality of first electrode lines to form a plurality of nodes. The amplifier CA may apply an electrical signal from each node in response to the driving signal applied through the driving line.

Each of the amplifiers CA may include a first integrator 212 for amplifying the applied electrical signal as a signal of a first polarity and a second integrator 214 for amplifying the applied electrical signal as a signal of a second polarity opposite to the first polarity. While performing the first integration process, the processor 140 operates repeatedly a plurality of times in order of the first integrator 212 and the second integrator 214 during the first time section such that the above-described amplifier CA may be controlled to perform the first integration process.

The processor 140 may control the amplifier CA to perform a second integration process for each of a plurality of electrical signals received from a plurality of nodes of the touch panel 110 during the second time section (S920). The second integration process may mean that the first integrator 212 and the second integrator 214 repeatedly operate a plurality of times in order of the second integrator 214 and the first integrator 212. The second time section and the first time section are not overlapped, and the second time section may be a next time section of the first time section. Thus, the second integration process may be performed after the first integration process is performed on all of the plurality of electrical signals received from the plurality of nodes.

The size of the first time section and the size of the second time section may be the same. For example, the first time section and the second time section may be the same as the driving period of the touch panel 110. The driving period of the touch panel 110 may be a time for applying a driving signal to all of the plurality of first electrode lines in the touch panel 110.

Meanwhile, while performing at least one of the first and second integration processes, the processor 140 may control the amplifier CA such that the output value of at least one of the first integrator 212 and the second integrator 214 is adjusted. The amplifier CA may further include a compensator 220 for adjusting the output value of at least one of the first integrator 212 and the second integrator 214 and the compensator 220 may control the absolute value of the output value of the integration circuit 210 to be small. For example, the compensator 220 may include a charging current source 224 for charging any one of the first integrator 212 and the second integrator 214, and a discharging current source 222 for discharging electric charges to the other of the first integrator 212 and the second integrator 214.

The processor 140 may control the above-described compensator 220 such that the difference between the output value of the first integration process and the output value of the second integration process is small. For instance, The processor 140 may control the above-described compensator 220 such that the difference between the output value of the first integration process and the output value of the second integration process is minimum. Specifically, the processor 140 may control the compensator 220 such that the first adjustment degree of the output value of the amplifier CA during the first integration process is different from the second adjustment degree of the output value of the amplifier CA during the second integration process. For example, when the size of the output value according to the first integration process is greater than the size of the output value according to the second integration process, the processor 140 may determine the first degree of adjustment greater than the second degree of adjustment.

The processor 140 may recognize the fingerprint of the user using the output value according to the first integration process and the output value according to the second integration process (S930). For example, the amplifier CA of the reception circuit 130 may output a voltage signal that is an output value amplified by performing a first integration process during a first time section. The signal processor converts the amplified voltage signal into a DC signal, and the analog-to-digital converter converts the DC conversion signal into a digital signal and transmits the digital signal to the processor 140. Similarly, during the second time section, which is the next time section of the first time section, the amplifier CA of the reception circuit 130 performs a second integration process to output a voltage signal that is an amplified output value, and the voltage signal may be converted to a digital signal through a signal processor, an analog-to-digital converter, and the like, and transmitted to the processor 140.

The processor 140 may recognize the fingerprint of the user by using the digitally converted output value of the first integration process during the first time section and the output value of the second integration process during the second time section. During the first time section, the output value of the first integration process may include the output values of the first integration process for a plurality of nodes, and during the second time section, the output value of the second integration process may include the output value of the first integration process for a plurality of nodes. The process may classify the output values of the first and second integration processes corresponding to each node, and obtain the fingerprint image after determining the pixel value of each node using the output values of the first and second integration processes corresponding to each node.

Figure 10:
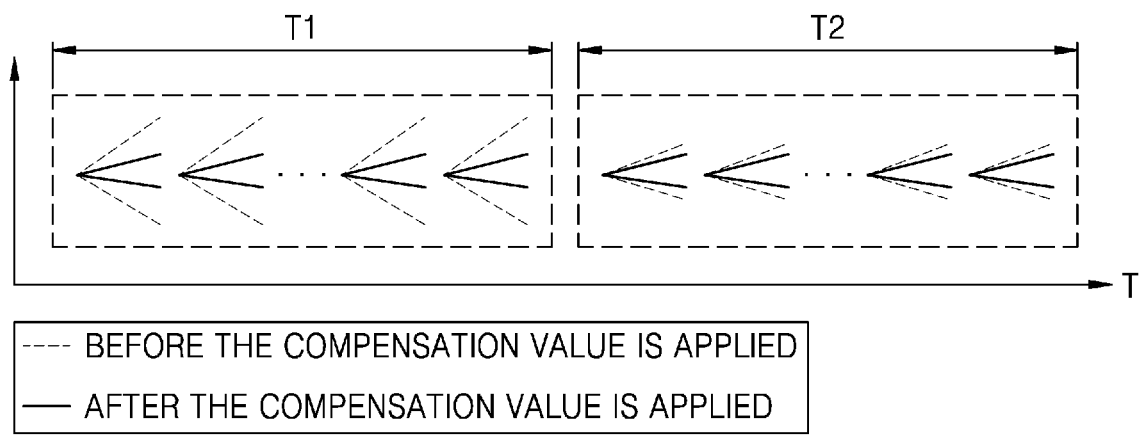
FIG. 10 is a reference diagram illustrating an integration process according to an example embodiment.

FIG. 10 is a reference diagram illustrating an integration process according to an embodiment.

As shown in FIG. 10, the processor 140 controls the amplifier CA to perform the first integration process for a plurality of nodes during the first time section T1, and controls the amplifier CA to perform the second integration process for the plurality of nodes described above during the second time section T2. Here, the sizes of the first and second time sections T1 and T2 may be the same as the driving period of the touch panel 110. During the first time section T1, the amplifier CA may amplify electrical signals received from a plurality of nodes connected to the amplifier CA. For example, when the touch panel 110 is composed of m×n nodes, and the amplifier CA is connected to each of the second electrode lines SLj, each amplifier CA may amplify electrical signals received from m nodes.

If the compensation value is not applied to the amplifier CA, due to a parasitic capacitance Cp and an offset voltage difference, as shown in FIG. 10, the difference between the values output from the amplifier CA during the first time section and the values output from the amplifier CA during the second time section may be large.

The processor 140 according to an example embodiment may apply a compensation value when amplifying an electrical signal received from a node. Then, as the output value according to the integration of the first integration process increases, when the amplifier CA performs the first integration process, the processor 140 controls the compensator 220 to be compensated with a large compensation value. When the amplifier CA performs the second integration process, the processor 140 controls the compensator 220 to be compensated with a small compensation value.

Thus, as the output value of the compensated amplifier CA becomes small, the amplifier CA may perform more integration processes. In addition, the compensation value by the above compensator 220 is a constant, and may be removed by the reception circuit 130 or the processor 140 after the amplifier during signal processing.

Those of ordinary skill in the art to which this embodiment pertains will appreciate that the disclosure may be implemented in a modified shape without departing from the essential characteristics of this embodiment. Therefore, the disclosed embodiments should be considered in descriptive sense only not in limited perspective sense. A scope is indicated in the claims rather than the foregoing description, and all differences within equivalent scopes should be construed as being included in the disclosure.

The elements of the finger print detection device described herein may be implemented using hardware components and software components. For example, the hardware components may include amplifiers, band-pass filters, analog to digital convertors, non-transitory computer memory and processing devices. A processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device.

Example embodiments include non-transitory computer-readable media including program instructions to implement various operations embodied by a computer. The media may also include, alone or in combination with the program instructions, data files, data structures, tables, and the like. The media and program instructions may be those specially designed and constructed for the purposes of example embodiments, or they may be of the kind well known and available to those having skill in the computer software arts. Examples of non-transitory computer-readable media include magnetic media such as hard disks, floppy disks, and magnetic tape; optical media such as CD ROM disks; magneto-optical media such as floptical disks; and hardware devices that are specially configured to store and perform program instructions, such as read-only memory devices (ROM) and random-access memory (RAM). Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

What is claimed is:

1. A fingerprint detection device comprising:
a touch panel including an array of nodes;
an amplifier comprising a first integrator configured to amplify an electrical signal received from the touch panel to a first signal of a first polarity and a second integrator configured to amplify the electrical signal to a second signal of a second polarity, wherein the electrical signal changes according to a touch of a user on the touch panel; and
a processor configured to control the amplifier to perform a first integration process and a second integration process with respect to a plurality of electrical signals received from a plurality of nodes of the touch panel,
wherein, in the first integration process, the first integrator and the second integrator operate repeatedly a plurality of times in a first sequence starting with the first integrator, during a first time period after a first reset, and in the second integration process, the second integrator and the first integrator operate repeatedly a plurality of times in a second sequence starting with the second integrator during a second time period after a second reset.

2. The fingerprint detection device of claim 1, wherein the processor is further configured to control the amplifier for the second integration process to be performed after the first integration process is performed on all of the plurality of electrical signals.

3. The fingerprint detection device of claim 1, wherein the second time period does not overlap the first time period.

4. The fingerprint detection device of claim 1, wherein the second time period succeeds the first time period.

5. The fingerprint detection device of claim 1, wherein a size of the first time period and a size of the second time period are same.

6. The fingerprint detection device of claim 1, wherein at least one of the first time period and the second time period is same as a one-time driving period of the touch panel.

7. The fingerprint detection device of claim 1, wherein the touch panel comprises:
a plurality of first electrode lines arranged in a first direction; and
a plurality of second electrode lines arranged in a second direction intersecting the first direction,
wherein the plurality of nodes are an area where one of the second electrode lines intersects the first electrode lines.

8. The fingerprint detection device of claim 1, wherein the amplifier further comprises a compensator configured to adjust an output value of at least one of the first and second integrators.

9. The fingerprint detection device of claim 8, wherein the compensator is further configured to adjust an absolute value of the output value to be minimum.

10. The fingerprint detection device of claim 8, wherein the compensator comprises:
a charging current source configured to charge one of the first and second integrators with electric charge; and
a discharging current source configured to discharge electric charge from the other of the first and second integrators.

11. The fingerprint detection device of claim 8, wherein the processor is further configured to control the compensator to reduce a difference between the output value of the first integration process and the output value of the second integration process is minimum.

12. The fingerprint detection device of claim 8, wherein the processor is further configured to control the compensator to adjust the output value by first adjustment degree during the first integration process and adjust the output value by a second adjustment degree during the second integration process, the second adjustment degree being different from the first adjustment degree.

13. The fingerprint detection device of claim 12, wherein the processor is further configured to determine that the first adjustment degree is greater than the second adjustment degree based on the output value of the first integration process being greater than the output value of the second integration process.

14. The fingerprint detection device of claim 1, wherein each of the first and second integrators comprises an operational amplifier and a capacitor connected in parallel with the operational amplifier.

15. The fingerprint detection device of claim 14, wherein a common voltage is applied to an inverting terminal of the operational amplifier included in the first integrator and a non-inverting terminal of the operational amplifier included in the second integrator.

16. The fingerprint detection device of claim 1, wherein the processor is further configured to recognize a fingerprint of a user using output values of the first and second integration processes.

17. A fingerprint detection method comprising:
performing a first integration process in which a first integrator and a second integrator sequentially and repeatedly operate a plurality of times starting with the first integrator, wherein the first integrator amplifies each of a plurality of electrical signals received from a plurality of nodes of a touch panel to a first signal of a first polarity during a first time period after a first reset and the second integrator amplifies each of the plurality of electrical signals to a second signal of a second polarity;
performing a second integration process in which the second integrator and the first integrator operate sequentially and repeatedly a plurality of times starting with the second integrator for each of a plurality of electrical signals during a second time period after a second reset; and
detecting a fingerprint of a user that touches the touch panel based on a result of the first integration process and the second integration process.

18. The method of claim 17, wherein the performing of the second integration process is performed after the first integration process is performed on all of the plurality of electrical signals.

19. The method of claim 17, wherein the second time period does not overlap the first time period.

20. The method of claim 17, wherein the second time period succeeds the first time period.

21. The method of claim 17, wherein a size of the first time period and a size of the second time period are same.

22. The method of claim 17, wherein at least one of the first time period and the second time period is same as a one-time driving period of the touch panel.

23. The method of claim 17, wherein at least one of the performing of the first integration process and the performing of the second integration process further comprises adjusting an output value of at least one of the first and second integrators.

24. The method of claim 23, wherein the adjusting of the output value comprises adjusting an absolute value of the output value to be minimum.

25. The method of claim 23, wherein the adjusting of the output value comprises at least one of:
charging any one of the first and second integrators with electric charge; and
discharging electric charge from the other of the first and second integrators.

26. The method of claim 24, wherein a first adjustment degree of the output value while performing the first integration process is different from a second adjustment degree of the output value while performing the second integration process.

27. The method of claim 26, wherein the adjusting of the output value comprises adjusting the output value by a first adjustment degree during the first integration process and adjusting the output value by a second adjustment degree during the second integration process, the second adjustment degree being different from the first adjustment degree.

28. The method of claim 27, wherein the adjusting of the output value comprises, based on the output value of the first integration process being greater than the output value of the second integration process, adjusting the first adjustment degree to be greater than the second adjustment degree.

29. A fingerprint detection device comprising:
a memory storing one or more instructions; and
a processor configured to execute the one or more instructions to:
perform a first integration process by controlling a first integrator and a second integrator to sequentially and repeatedly operate a plurality of times starting with the first integrator, wherein the first integrator amplifies each of a plurality of electrical signals received from a plurality of nodes of a touch panel to a first signal of a first polarity during a first time period after a first reset and the second integrator amplifies each of the plurality of electrical signals to a second signal of a second polarity;
perform a second integration process by controlling the second integrator and the first integrator operate sequentially and repeatedly a plurality of times starting with the second integrator for each of a plurality of electrical signals during a second time period after a first reset; and
detect a fingerprint of a user that touches the touch panel based on a result of the first integration process and the second integration process.

* * * * *